Jan. 23, 1951  J. E. BLANDING  2,539,227
CONNECTING ROD BEARING SUPPORT
Filed May 27, 1946
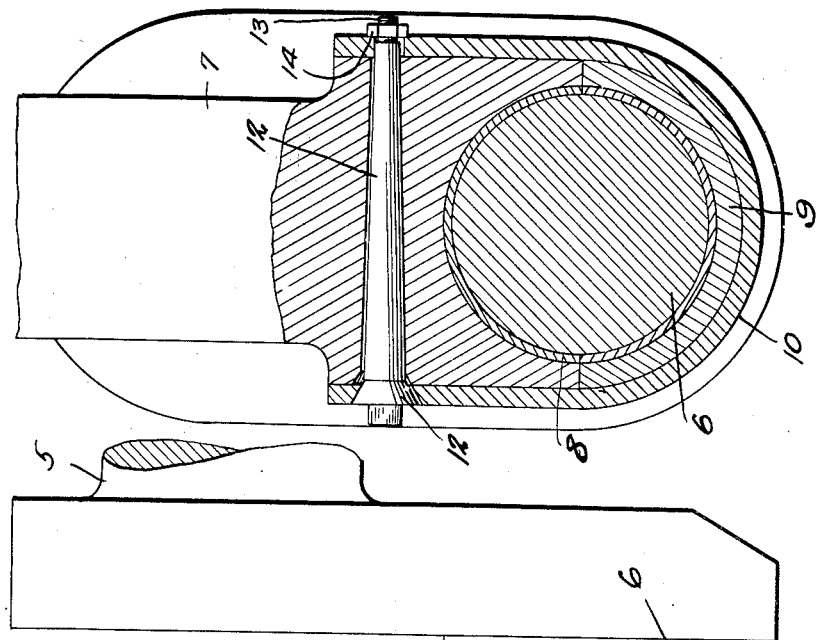
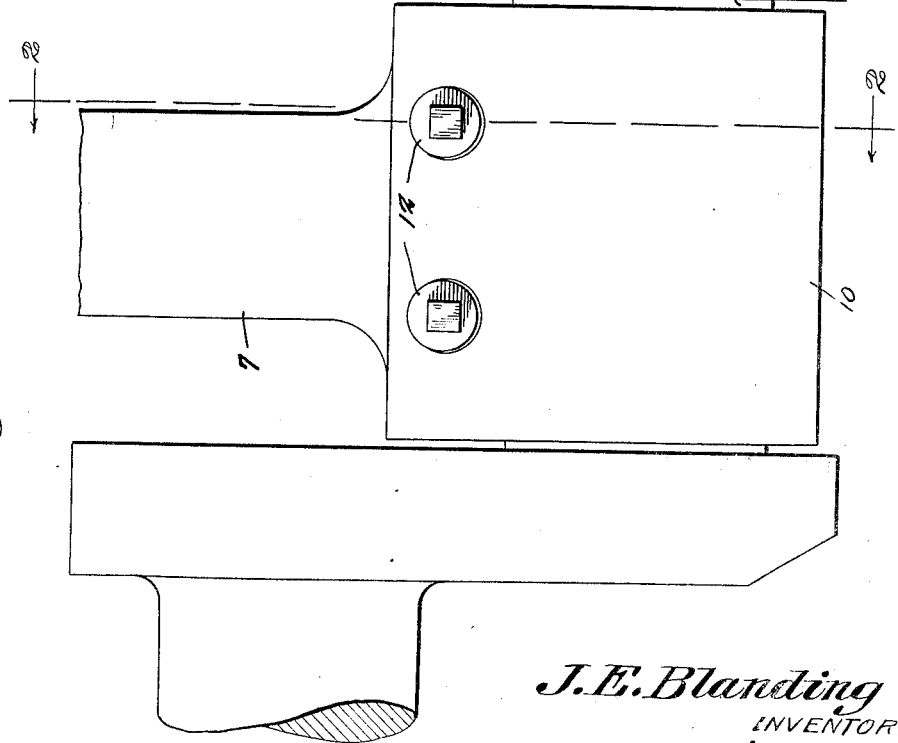
J. E. Blanding
INVENTOR.
BY
ATTORNEYS.

Patented Jan. 23, 1951

2,539,227

UNITED STATES PATENT OFFICE 2,539,227

CONNECTING ROD BEARING SUPPORT

Joseph Edward Blanding, New London, Conn., assignor of one-half to Patrick B. McNamara, Groton, Conn.

Application May 27, 1946, Serial No. 672,345

1 Claim. (Cl. 308—68)

This invention relates to connecting rod bearings, the primary object of the invention being to provide means for securing connecting rod bearings to a crank shaft of an engine, in such a way as to reduce the space required in the operation of the connecting rod, within the crank case.

An important object of the invention is to provide a securing means for the lower bearing of a connecting rod, which may be readily and easily adjusted or removed to compensate for wear.

Still another object of the invention is to provide a connecting rod bearing support to permit of easy access to the bearing, to make adjustments, should the bearing become loose, due to vibrations of the motor of which the connecting rod forms a part.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing

Figure 1 is an elevational view illustrating a connecting rod bearing support, constructed in accordance with the invention, as mounted on a connecting rod and crank shaft pin.

Figure 2 is a sectional view taken on line 2—2 of Fig. 1.

Referring to the drawing in detail, the reference character 5 indicates a crank shaft, and the reference character 6 indicates the crank shaft pin, to which a connecting rod is secured.

The connecting rod is indicated by the reference character 7 and is formed with a curved end to accommodate the curved bearing 8 which embodies separable sections, fitted over the crank pin 6.

The reference character 9 indicates a curved bearing support that has its edges milled to provide a close fit between the end of the connecting rod 7 and support, as clearly shown by Fig. 2 of the drawing.

The main bearing support which is indicated by the reference character 10, is in the form of a yoke which is of a width equal to the width of the end of the connecting rod which is secured to the crank shaft pin 6. This yoke is formed with openings, disposed adjacent to the ends thereof, the openings being designed to accommodate the tapered bolts 11 which are formed with heads 12 and threaded ends 13, the threaded ends 13 accommodating the nuts 14, whereby the bearing support or yoke 10 may be secured in position in such a way as to insure against the bolts loosening, under normal conditions.

From the foregoing it will be seen that due to the construction shown and described, I have provided a bearing support and bearing, of a construction to require appreciably less space than usually required in crank cases for the operation of the usual connecting rod.

It will further be seen that easy access may be had to the bearings of the connecting rod should it become necessary to disassemble the motor, to the end that adjustments on repairs may be readily accomplished.

What is claimed is:

A connecting rod bearing for crank shafts, comprising separable bearing sections adapted to be fitted around a crank shaft pin, said bearing being fitted within the curved end of a connecting rod, a curved bearing support cooperating with the curved bearing end of the connecting rod in encasing the bearing sections, a yoke fitted around the bearing and completely enclosing said bearing and support, said yoke having openings formed in the sides thereof, said connecting rod having tapered openings extending transversely therethrough, tapered bolts extending through the openings of the yoke and connecting rod adjustably securing the yoke to the connecting rod, and said bolts having tapered heads fitted in tapered openings of the yoke, securing the bolts within the tapered openings.

JOSEPH EDWARD BLANDING.

REFERENCES CITED

The following references are of record in the file of this patent:

UNITED STATES PATENTS

| Number | Name | Date |
|---|---|---|
| 693,402 | Johnson | Feb. 18, 1902 |
| 1,092,118 | Strite | Mar. 31, 1914 |